Oct. 16, 1945.                    L. S. WILLIAMS                    2,387,202
                                    BEARING
                              Filed Nov. 7, 1942          3 Sheets-Sheet 1
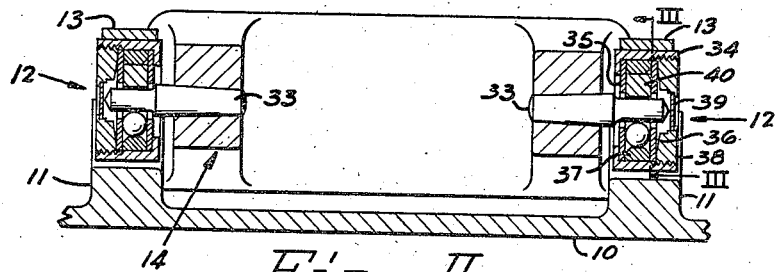
Fig. II
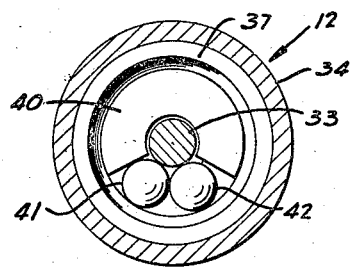
Fig. III
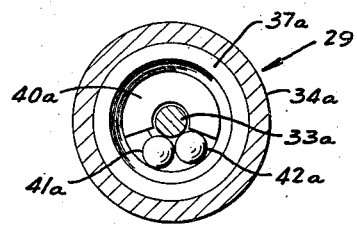
Fig. IV
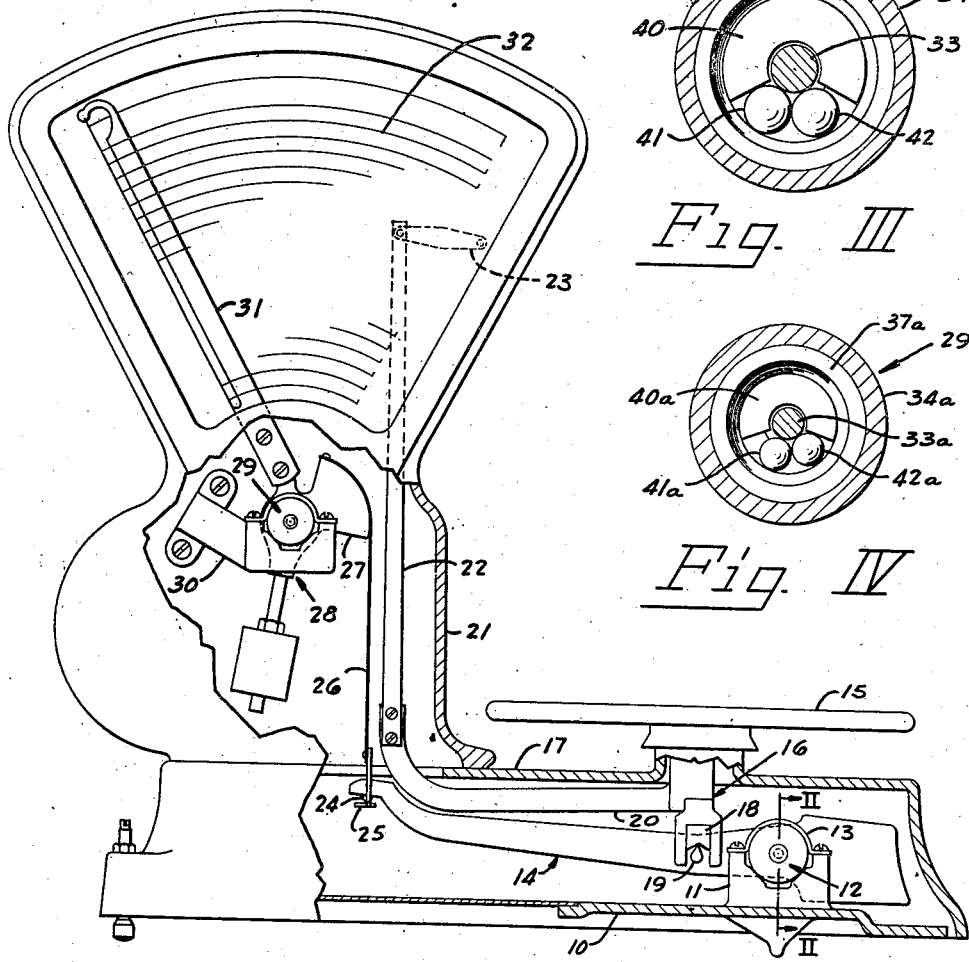
Fig. I
Lawrence S. Williams
INVENTOR
BY Marshall & Marshall
ATTORNEYS Oct. 16, 1945.   L. S. WILLIAMS   2,387,202
BEARING
Filed Nov. 7, 1942   3 Sheets-Sheet 2
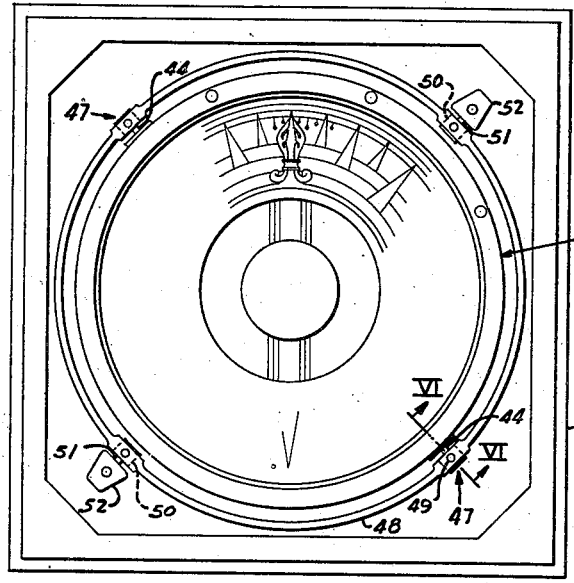
Fig. V
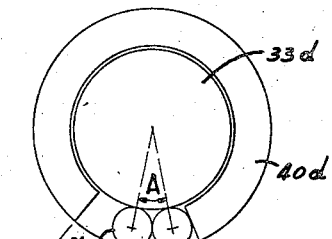
Fig. X
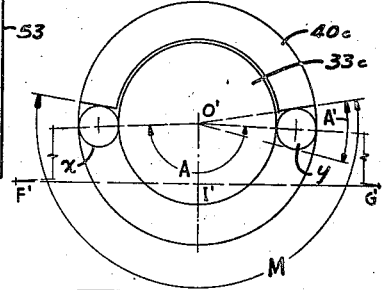
Fig. IX
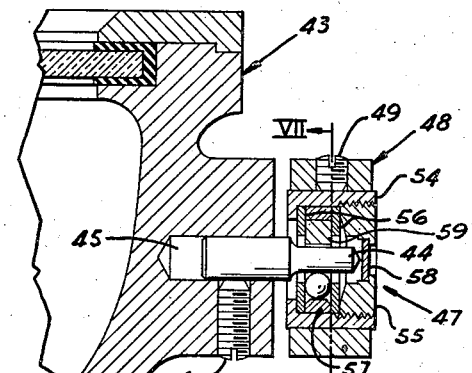
Fig. VI
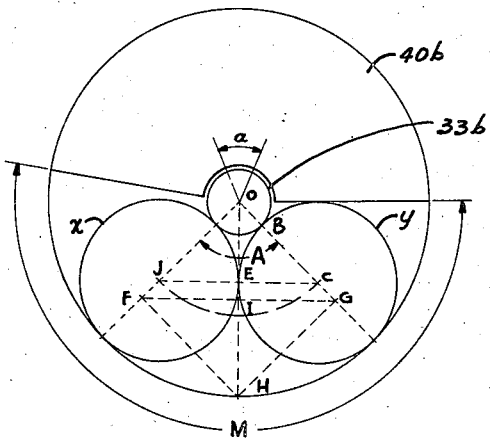
Fig. VIII
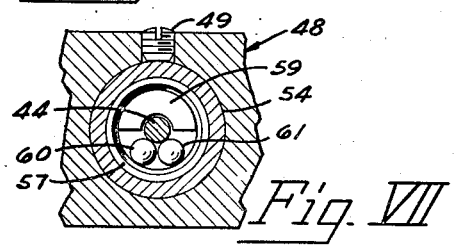
Fig. VII
Lawrence S. Williams
INVENTOR
BY Marshall and Marshall
ATTORNEYS Oct. 16, 1945.  L. S. WILLIAMS  2,387,202
BEARING
Filed Nov. 7, 1942    3 Sheets-Sheet 3
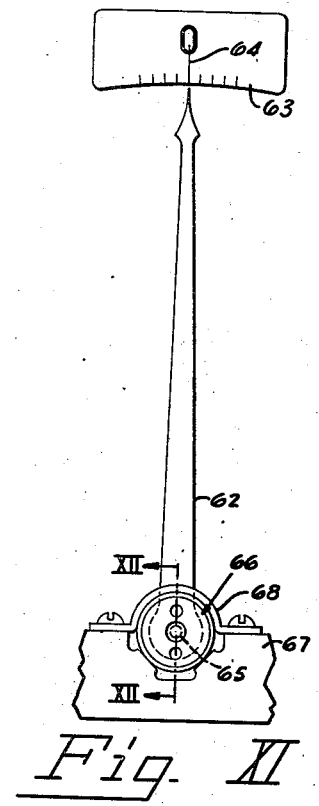
Fig. XI
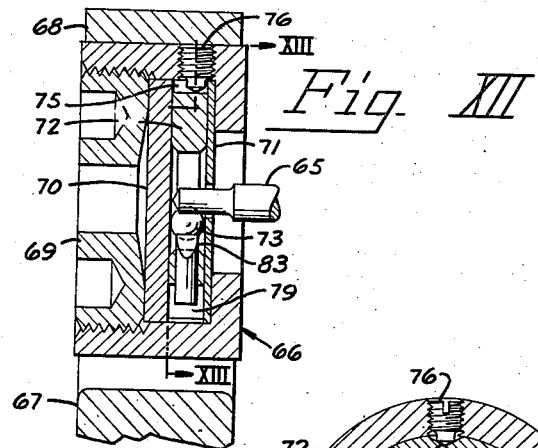
Fig. XII
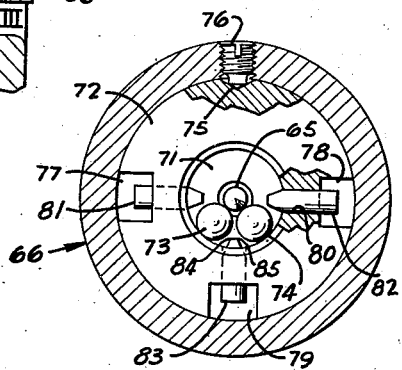
Fig. XIII
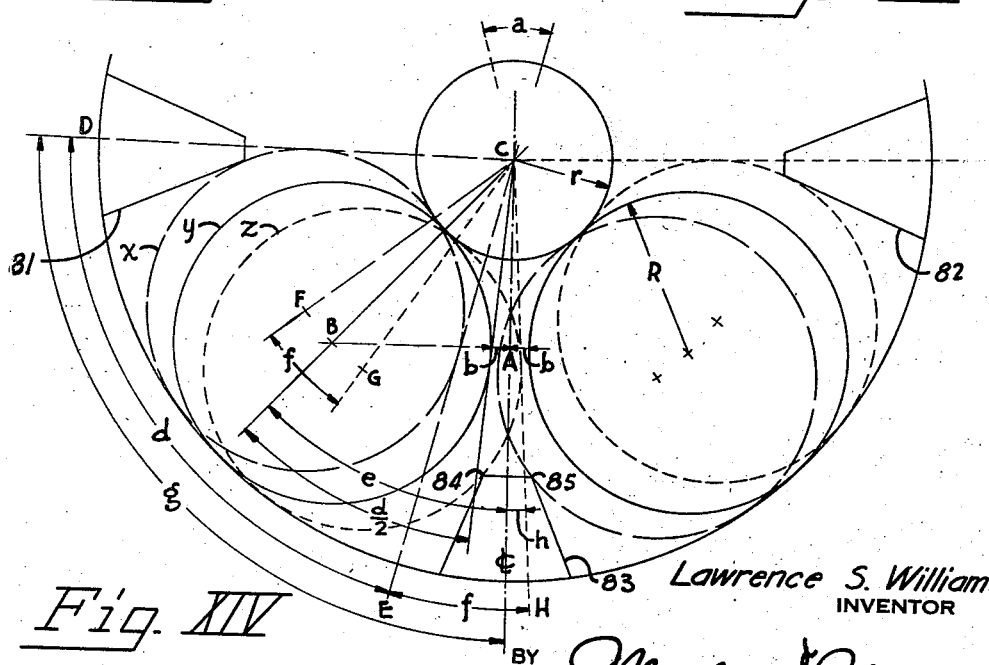
Fig. XIV
Lawrence S. Williams
INVENTOR
BY Marshall & Marshall
ATTORNEYS Patented Oct. 16, 1945

2,387,202

UNITED STATES PATENT OFFICE 2,387,202

BEARING

Lawrence S. Williams, Toledo, Ohio, assignor to Toledo Scale Company, Toledo, Ohio, a corporation of New Jersey Application November 7, 1942, Serial No. 464,849

9 Claims. (Cl. 308—2)

This invention relates to bearings for the pivotal mounting of oscillating members where the angular magnitude of the oscillations is substantially less than the 360°.

In many types of scientific and highly accurate commercial equipment it is necessary to mount oscillating members, such as levers, pendulums and indicators, so they will be as friction-free as possible in their mountings and thus will not create errors in the equipment of which they are a part. One method of mounting such members has been by the use of knife edge pivots and V block bearings. This type of mounting has a very low coefficient of friction and has been satisfactory except where the possibility of "riding out" of the knife edges has existed.

When the force acting upon the oscillating member disturbs its center of gravity, or exerts a sidewise force on the member, it may very easily lift one or more of the knife edges out of the bearings in which it rests. This will cause incorrect operation by introducing additional friction and by causing "shift" (a change in the distances between pivots) and even may damage the knife edge or the bearing itself.

To eliminate the possibility of "riding out," oscillating members have been mounted in standard ball bearings, the outer race being fastened to the stationary portion of the instrument and the balls carrying an axle or shaft which supports the oscillating member. Small as is the friction in a standard ball bearing it has still been found to be too great in many instances and the beneficial result of the use of ball bearings, that is the prevention of "riding out," has been more than overcome by the increased friction resulting from the use of the ball bearings.

It is an object of this invention to provide a bearing for mounting oscillatory members having an angular magnitude of oscillation substantially less than 360°.

It is a further object of this invention to provide a bearing for mounting oscillating members which will prevent "riding out" of the members and yet will have a low coefficient of friction.

It is another object of this invention to provide a ball bearing having only two balls for supporting the oscillating member mounted thereon.

It is a still further object of this invention to provide a two-ball bearing for mounting oscillating members, the angular magnitude of oscillation of which is known or can be estimated, and which may be modified to provide the best form of construction for the particular magnitude of oscillation and degree of sensitivity desired.

It is yet another object of this invention to provide a ball bearing for mounting oscillating members which will control the action of the antifriction balls incorporated therein.

A further object of this invention is to provide a two-ball bearing which will automatically maintain the balls in spaced relation, thus eliminating friction caused by the balls rubbing together.

More specific objects and advantages are apparent from the description, in which reference is had to the accompanying drawings illustrating preferred forms of bearings embodying the invention.

In the drawings:

Fig. I is a view in elevation, certain parts being shown in section and certain parts broken away, of a weighing scale employing bearings embodying the invention.

Fig. II is a vertical sectional view, taken substantially from the position indicated by the line II—II of Fig. I.

Fig. III is an enlarged detailed view, taken substantially on the line III—III of Fig. II and illustrating a bearing embodying the invention.

Fig. IV is a view similar to Fig. III, but of another bearing embodying the invention incorporated in the scale illustrated in Fig. I.

Fig. V is a plan view of a mariner's compass, the gimbal mounting of which incorporates bearings embodying the invention.

Fig. VI is a fragmentary vertical sectional view on an enlarged scale, taken on the line VI—VI of Fig. V.

Fig. VII is a fragmentary detailed view in section, taken substantially on the line VII—VII of Fig. VI.

Fig. VIII is a diagram illustrating construction principles and the calculations involved therein of a bearing embodying the invention.

Fig. IX is a similar diagram illustrating other construction principles.

Fig. X is still another diagram illustrating construction principles.

Fig. XI is a fragmentary view, in elevation, of the indicator of an even balance scale equipped with a bearing embodying a refined modification of the invention.

Fig. XII is a vertical sectional view, on an enlarged scale, taken on the line XII—XII of Fig. XI.

Fig. XIII is a vertical sectional view, taken substantially on the line XIII—XIII of Fig. XII.

Fig. XIV is a diagram illustrating the principles employed in the construction of the modification of the invention illustrated in Figs. XII and XIII.

These specific drawings and the specific description that follows merely disclose and illustrate the invention and are not intended to impose limitations upon the claims.

Mounted on a base 10 (Fig. I) are fulcrum stands 11 in which are clamped bearings 12. The bearings are held in the substantially V shaped seats of the fulcrum stands 11 by clamps 13. Mounted in the bearings 12 is a main lever 14 which extends horizontally above the base 10. A load receiver 15 is supported on a spider 16 which extends downwardly through an opening in the upper surface of a housing 17 mounted on the base 10. Bearings 18 are mounted in the spider 16 and ride on load pivots 19 of the main lever 14. An arm 20 of the spider 16 extends along within the housing 17 and then upwardly into an upper housing 21 where it is connected to a bar 22 which is pivotally attached to a link 23 pivotally connected to the inner wall of the housing 21. The arm 20, bar 22 and link 23 form a checking parallelogram for the load receiver 15 to insure its vertical movement. A cone-point pivot 24 is mounted in the nose end of the lever 14 and rests in a stirrup 25 which is attached to the lower end of a vertically extending metallic ribbon 26. The upper end of the ribbon 26 overlies the arcuate face of, and is clamped to, a sector-like cam 27 which is an integral part of a load counterbalancing pendulum 28 pivotally mounted in bearings 29 supported in a bracket 30 attached to the housing 21. An indicator 31 is attached to the pendulum 28 and sweeps over a fan-shaped chart 32 to indicate the weight of load placed upon the scale.

Extending horizontally from the main lever 14 (Fig. II) are two tapered shank pins 33, which serve as trunnions for the main lever 14 in cooperation with the bearings 12. Each of the pins 33 has a cylindrically-shaped portion which extends into a bearing 12 and on the end of which there is turned a sharp point. Each bearing 12 (Figs. II and III) consists of an outer housing 34, in which are clamped side wall members 35 and 36, and an outer race 37. The members 35 and 36 are held in place in the housing 34 by the clamping action of a retaining nut 38 screwed into the housing 34. The retaining nut 38 also holds a thrust disk 39 against which bears the point on the end of the pin 33. A substantially C shaped spacer 40 is located in the space between the outer race 37 and the pivot pin 33. Two balls 41 and 42 are located in the remaining space between the outer race 37 and the pin 33 and are in contact with both the race and the pin, thus serving to support the pin 33 in the bearing 12.

In Fig. IV, which illustrates the bearing 29, the construction shown is identical with that shown in Fig. III with the exception that the angular amplitude of oscillation of the pin which is fixed to the pendulum 28 is much larger than that of the pin 33 fixed to the main lever 14. An outer housing 34a has clamped therein an outer race 37a between the inner surface of which and a pin 33a there is located a substantially C shaped spacer 40a and two balls 41a and 42a.

In Fig. V a hemispherically-shaped compass bowl 43 is supported by pins 44 (Fig. VI) which are held in bores 45, in the body of the bowl 43, by set screws 46. The pins 44 pivot the bowl 43 in bearings 47 which are fastened, by means of set screws 49, into a gimbal ring 48 surrounding the compass bowl 43. The two bearings 47 are diametrically opposed and thus pivotally support the compass bowl 43 for oscillation in one direction. A second set of bearings 50 are similarly fastened into the gimbal ring 48, their center lines being at an angle of 90° from the center lines of the bearings 47. Pins 51, which extend into the bearings 50 as pivots, are clamped in vertical posts 52 which are fastened to the base of an outer housing 53.

The mounting for the compass bowl 43 is the standard gimbal mounting in which bearings embodying the invention replace knife edges or standard ball bearings. The bearings 47 are identical in construction with the bearings illustrated in Figures III and IV and comprise outer housings 54 in which are clamped, by means of a clamp nut 55, side wall members 56, an outer race 57 and a thrust disk 58. Located in the space between the inner surface of the race 57 and the pin 44 are a spacer 59 and two balls 60 and 61.

The rules and principles of construction of the bearings illustrated in Figs. III, IV and VII are shown in the diagrams of Figs. VIII, IX and X.

In constructing bearings embodying the invention the first requirement is that the sum of the diameters of the shaft and of the two balls must be equal to the inner diameter of the outer race and the shaft must be concentrically located with respect to the outer race. The relative size of the shaft and balls may vary, as shown by a comparison of the diameters of the shafts and balls in Figs. VIII and IX, as long as the conditions mentioned above are maintained. The force created by the load carried on the shaft is radially borne by the two balls no matter what their relative size to the shaft as long as they do not get diametrically opposed on opposite sides of the shaft. If the two balls are permitted to get 180 degrees apart, they will no longer support the shaft, which will fall between the balls to the bottom of the race. This, then is the second principle governing the construction of the bearings herein disclosed. The spacer or other means located in the space between the inner wall of the race and the shaft, must prevent the balls from reaching such a diametrically opposed position.

Although the shaft will be perfectly supported on the balls no matter how far apart they are permitted to get, as long as the angular relation between their centers is less than 180 degrees, the further apart they are permitted to get the greater will be the load carried by each individual ball. In Fig. VIII, the lines OF and OG are drawn through the center of the shaft O and the centers J and C of the balls X and Y respectively. If the balls are so positioned that the angle FOG is bisected by a vertically drawn line OH, tangent to both of the balls, which may arbitrarily be allowed to represent the number of pounds or ounces or grams of force acting on the shaft, then the force acting on each ball may be calculated as follows:

A force parallelogram FOGH is constructed in which the lines OF and OG represent the components of the force represented by the line OH, which act on each of the balls. The angle FOG being bisected by the line OH results in the line FG, connecting the points F and G, being perpendicular to the line OH at its center point. Therefore, the line OI represents one-half as much force as the line OH and the angle OIG is 90°. With these two facts the length of the lines OF and OG, which represent the number of grams force acting on each of the balls, is:

$$OF \text{ (or } OG) = \frac{OI}{\cos \angle IOF \text{ (or } \angle IOG)} \quad (1)$$

With this formula in mind, referring to Fig. IX, it can be seen that the angle I'O'G' has a much greater number of degrees than the angle IOG in Fig. VIII and therefore, by applying the formula, if O'I' equals OI, it is found that the length of the line O'F' or O'G' (the force acting on the individual balls) is much greater than the length of the line OF or OG.

It is therefore very desirable that the balls be kept as close together as possible at all times. The angular relation of the faces of the spacer member, in number of degrees, is a function of the size of the balls and the shaft and the number of degrees through which the shaft oscillates. The general statement of the angle is that it is the sum of the angular displacement of the two balls in the space provided for them plus their angular revolution in degrees under the partial rotation of the shaft.

Therefore, in Fig. VIII, where the line JEC connects the centers of the balls X and Y and is, therefore, perpendicular to the line OH at E (the point of tangency of the circles X and Y), if A=FOG=the angular displacement of one of the balls, in degrees
$a$=the angle of oscillation of the shaft, in degrees
$r$=OB=the radius of the shaft, in units of measurement
R=BC=EC=the radius of the balls, in units of measurement
M=the angular relation of the faces of the spacer, in degrees, then, $$\text{Sine } \frac{A}{2} = \frac{EC}{EC+OB}$$

$$M = A + A + \frac{OB}{2BC+2OB} xa$$

Or, in general terms:

$$\text{Sine } \frac{A}{2} = \frac{R}{R+r} \quad (2)$$

$$M = A + A + \frac{r}{2R+2r} xa \quad (3)$$

Applying these formulae to the bearing illustrated diagrammatically, in Fig. VIII, reveals the following further facts:

In Fig. VIII, let, $a$=45 degrees
$r$=1 unit of measurement
R=2½ units of measurement
then $$\text{Sine } \frac{A}{2} = \frac{2½}{2½+1} = \frac{2.5}{3.5} = .7143$$

$$\frac{A}{2} = 45½^+ = \text{angle } IOG$$

$$A = 91^+$$

$$M = 91^+ + 91^+ + \frac{1}{5+2} \times 45$$

$$M = 182^+ + \frac{45}{7}$$

$$M = 188½° \text{ (approx.)}$$

Force on each ball $= \frac{5}{\cos 45½} = \frac{5}{.7009} = 7.13$

Therefore, the angular relation between the faces of a bearing having balls 2½ times the diameter of a shaft which turns through 45°, should be 188½°.

However, a bearing constructed with such large balls, with reference to the size of the shaft, has some disadvantages. Among these are the large size of the outer race which is required and the possibility that the inertia of the balls may be difficult to overcome with the shaft and that the shaft will slide on the surfaces of the balls. It may, therefore, be desirable to consider the opposite extreme, as illustrated in Figs. IX and X where the diameter of the shaft is four times the diameter of the balls.

Considering Fig. IX first, it has already been mentioned that a design such as this would not be practical because of the fact that the balls would be permitted to get so far apart in the race that the force on each ball would be very large. For purposes of illustration the angular relation between the faces of the spacer, M, has been made such that lines drawn between the center of the shaft and the centers of the balls intersect at an angle of 175°. If we let:

$$r = 4$$

$$R = 1$$

$$\text{Sine } \frac{A'}{2} = \frac{1}{1+4} = \frac{1}{5} = .2$$

$$\frac{A'}{2} = 11¼ \text{ plus}$$

$$A' = 23 \text{ and, therefore,}$$

since the lines connecting the center of the balls meet at 175°

$$M = 175° + \frac{23}{2} + \frac{23}{2}$$

$$M = 198°$$

This will maintain support of the shaft by the balls, but, if the load on the shaft is 10 units of weight then:

Load on each ball $= \frac{5}{\cos 87½} = \frac{5}{.04362} = 114.62$ (as compared to 7.13 for the ratios illustrated in Fig. VII) which is a prohibitive force since it would create a great amount of friction.

It is for this reason, as explained generally above, that the spacer should be so designed that it occupies all but the space needed by the two balls to permit them to make a partial revolution around the shaft under impetus of the partial rotation of the shaft.

Referring now to Fig. X, the bearing diagrammatically illustrated here, has the same respective shaft and ball diameters as that illustrated in Fig. IX, but has the spacer constructed to maintain the conditions just described with relation to the space between the balls.

In Fig. X, if, $$r = 4$$
$$R = 1$$
A=23, as calculated above

Then:

$$M = 23 + 23 + \frac{4}{2+8} \times 45$$

$$M = 46 + \frac{2}{5} \times 45$$

$$M = 64°$$

The maximum force on each ball, even if the balls become separated as far as possible so that they touch the spacer (as in Fig. IX) with a 41° angle between the lines connecting the center of the shaft and the centers of the balls would be:

$$\text{Force on balls} = \frac{5}{\cos 20\tfrac{1}{2}} = \frac{5}{.9367} = 5.338$$

It is to be noted, however, that in the bearing of Fig. X, the balls would be brought back together upon completion of the first oscillation of the shaft, due to the action of the spacer and that in Fig. IX, they would not. (Assuming the same angle of oscillation of the shaft in both instances.)

Construction of this kind, however, presents a further practical difficulty which is the provision of small enough balls to permit the extreme ratios between size of shaft and of balls to give such excellent low forces acting on each ball. In instruments of the type for which the bearings embodying the invention are primarily designed, the shafts are often as small as 1/16 of an inch in diameter and, thus balls would have to be 1/64 of an inch in diameter, which would not be practical.

For these many reasons, it has been found that the most practical ratios between the shafts and balls are those in which the lines from the center of the shaft through the centers of the balls, when adjacent, meet at angles of from 50° to 90°; or a range in ratios of the radius of the shaft to the radii of the balls of from approximately 1:2 to 3:2. The spacers, of course, should be constructed in accordance with Fig. VIII (Fig. IX illustrates an undesirable situation).

In Fig. XI there is illustrated a scale indicator 62 which cooperates with a chart 63 having a centrally located zero indicium 64 to indicate a condition of balance in a scale of the even-armed or "over and under" type. (Mechanism connecting the indicator to the weighting scale, since it is not part of the instant invention, is not shown but it may be any standard device.) The indicator 62 is mounted on a shaft 65 which extends into the interior of a pair of ball bearing housings 66, one of which is mounted on each side of the plane of movement of the indicator 62. Each of the ball bearing housings 66 is held in place on a frame member 67 by means of a C shaped clamp 68.

The ball bearing housing 66 is substantially cup-shaped, having an inside thread into which is threaded a disk-shaped retainer 69 serving to hold in place a thrust plate 70, an end plate 71, an annular member 72, and two balls 73 and 74. The annular member 72 has a notch 75 in its periphery in which is engaged a cone point set screw 76 for correctly positioning the annular member relative to the housing 66 through which the set screw 76 is threaded. The center hole of the annular member 72 serves as the outside race for the two balls 73 and 74 supporting the indicator shaft 65. Three notches 77, 78 and 79 are cut in the annular member 72. Three very carefully positioned holes 80 are drilled through the annular member 72 extending radially from the center of the member 72 into the notches 77, 78 and 79. Wedge-pointed pins 81, 82 and 83 are inserted into the holes 80 leading from the notches 77, 78 and 79 respectively, the wedge-shaped point of the pin 81 serving as a left-hand or outer stop for the ball 73, the pin 82 serving as a right-hand or outer stop for the ball 74 and the pin 83 serving as a center stop for both of the balls.

The holes through which the pins are inserted, and the pins themselves, must be very carefully located and constructed because they serve as the limiting means for the oscillations of the two balls 73 and 74 caused by the oscillations of the shaft 65 and the indicator 62. The end stops 81 and 82 serve the same purpose as the C shaped stop members 40 in the embodiments of the invention described in Figs. I through X, i. e., to limit the outward movement of the balls. They must be so positioned and constructed that when one of the balls is in contact with one of the outer stops, and the indicator is at one of the extreme points of oscillation, a line drawn through the center of the shaft 65 tangential to the outer edge of the ball in contact will mark the side of the maximum angle through which the ball is movable under impetus of the oscillation of the shaft 65. In other words, upon the oscillation of the shaft 65 and the indicator 62, through the predetermined angle, each of the balls 73 and 74 revolves through a specified angle around the shaft 65. The respective outer stop 81 and 82, and the corners 84 and 85 of the center stop 83, which contact the balls 73 and 74 respectively, limit the travel of the balls to that distance which they must travel to allow the shaft 65 to oscillate through the desired angle. As is shown in Figs. XI, XII and XIII, when the indicator 62 is in line with the zero indicium, the balls 73 and 74 are equidistantly positioned between their respective stops.

The center stop 83 has been provided, in this more sensitive embodiment of the invention, to cooperate with the outer stops in maintaining a definite clearance between the adjacent surfaces of the balls 73 and 74. If these surfaces are permitted to come in contact, as would occur in the embodiment of the invention explained in Fig. VIII, since the contacting surfaces are moving in opposite directions at all times, friction is created which appreciably detracts from the accuracy of a highly sensitive scale. The center stop 83 however does not prevent the two balls 73 and 74 from coming into contact. They can still do this if the scale is jarred so that one or both of them is moved relative to the race or the center shaft. But, the center stop and the end stops limit the travel of the balls under the predetermined oscillation of the indicator. If, for example, the ball 74 is jolted downwardly and comes into contact with the ball 73, the first oscillation of the indicator in a clockwise direction will correct this condition. When the indicator is rotated in a clockwise direction, the balls 73 and 74 revolve around the shaft 65 in a clockwise direction and the ball 74 strikes the corner 85 of the center stop 83 before the indicator is swung to the limit of its oscillation. The ball 74, therefore, since it can move no further, rotates in position sliding on the race formed by the inner surface of the annular member 72 and the shoulder 85 until the indicator reaches the limit of its oscillation and the ball 73 comes into contact with the left-hand stop 81. At this point the two balls once again are properly spaced and will remain so spaced until the scale inadvertently receives another blow or jar after which they can be restored to their correct spacing by a single oscillation of the indicator.

Contact between the balls does not destroy the accuracy of the scale other than momentarily. The first oscillation thereafter restores the balls to their proper spaced relationship. This first oscillation, of course, occurs as soon as an article to be weighed is placed on one of the scale platters.

A bearing of this more accurate type is constructed according to principles similar to those employed in the construction of the simpler form. In Fig. XIV: $R$=radius of the ball; $r$=radius of the shaft; $a$=the oscillation of the shaft in degrees; and $b$=one-half of the clearance to be maintained between the balls. The value $b$ is purely arbitrary and is in terms of linear (not angular) distance. It should be as small as practicably can be maintained.

In Fig. XIV there has been constructed a center line which serves as a locating line from which the positions of the two end stops and the center stop may be calculated. This center line is equidistantly positioned between the surfaces of the two balls when the shaft is centrally located and the indicator stands at zero. In Fig. XIV, each of the balls is shown in three important positions, the left-hand ball being used for purposes of calculation and being shown in its three positions, designated X, Y and Z, the X position being shown in dash lines at the limit of outward travel, the Z position being shown in dotted lines at the limit of inward travel and the Y position being shown in solid lines equidistantly between these two (the position of the ball when the shaft 65 and indicator 62 are located centrally between their extremes of oscillation). The three corresponding positions of the right-hand ball are shown in lines corresponding to those used to illustrate the three positions of the left-hand ball. The above mentioned center line is indicated by the line CA and its vertical extension, drawn from the center C of the shaft through a point equidistant between the two balls when they are at their central (solid line) position. $d$ is the angle between two lines CD and CE drawn through the point C tangential to opposite sides of the left-hand ball in its outside dash-line position. ($d$=the angular displacement of the ball in the race.) $e$ is the angle subtended by the center line CA and a line CB drawn from the center of the shaft to the center of the left-hand ball in its central (solid line) position. $e$ may then be calculated according to equation number (2) in the above calculations where:

$$\text{sine angle } BCA = \frac{BA}{CB} \text{ or sine } e = \frac{R+b}{R+r}$$

$d$ (the angular displacement of the ball) is calculated according to Equation Number 2 (as illustrated in Fig. VIII)

$$\text{sine } \frac{d}{2} = \frac{R}{R+r}$$

The angle $f$ is equal to the travel in degrees of the center point B of the left-hand ball between its maximum points F and G and is calculated by the equation:

$$f = \frac{r}{2R+2r} x a$$

With these values it is possible to calculate the angular relation between the center line CA and the line CD that is tangential to the left ball at its outermost point of travel and that passes through the center of the shaft. This angle is designated in Fig. XIV as $g$ and may be determined according to the following equation:

$$g = e + \frac{d}{2} + \frac{f}{2}$$

The next line to be located is the line CH which passes through the center of the shaft and is tangential to the innermost surface of the ball in its innermost (dotted line) position Z. The angular relationship between this line and the center line is negative because the small clearance $2b$ between the balls is less than the distance represented by the angle $f$ through which the balls oscillate. The right position of the left-hand ball is further to the right than the left position of the right-hand ball. This angle has been given the symbol $h$ and may be calculated by the following equation:

$$h = g - d - f$$

The particular form of the end and center stops is not essential to the invention, it being necessary only that they are constructed and placed to limit the travel of each of the balls to the angle $g$ in Fig. XIV. This angle $g$ varies according to the oscillation of the shaft and, of course, according to the ratios between the radii of the shaft and the balls, and may vary because of a change in the arbitrary clearance distance $2b$ which is desired to be maintained between the balls.

If an outer stop of the type disclosed in Figures VIII, IX and X, i. e., a C shaped spacer, is used in the bearing of Fig. XIV, the faces of the spacer are designed to lie on the line CD and on the corresponding line on the opposite side of the bearing.

If, however, the wedge-pointed pins of Figs. XII and XIII are used (they are shown in position in Fig. XIV), the lines CD and CH need not be calculated. It is only necessary to locate the points F and G and to construct the circles Y and Z. The points of contact between the stops and the balls can lie anywhere on the respective circles representing the balls in the positions of contact. (For example, the point 84 lies on the circle Z, in Fig. XIV).

Although the particular shape of the stops is not essential to the bearing of Fig. XIV, the wedge-pointed pins disclosed are particularly desirable because a bearing so equipped can be adapted for use with oscillating members having different angles of oscillation merely by inserting the pin into the race farther or less far to give the balls a less or greater free space for oscillation.

It has been found that bearings constructed according to this finer more accurate modification of the invention with the above described clearance maintaining feature only have approximately one-tenth as much friction as bearings constructed in accordance with the simpler design disclosed.

The embodiments of the invention that have been disclosed may be modified to meet various requirements.

Having described the invention, I claim:

1. An antifriction bearing for mounting trunnions of an oscillating member having an angle of oscillation of substantially less than 360° comprising an outer race concentric with respect to the trunnions, two supporting balls located therein and stops attached to said race including a stop between said balls for defining the limits of movement of each of said balls.

2. An antifriction shaft bearing comprising two supporting balls, a race in which said balls rotate, said race being concentric with respect to the shaft, and fixed stops inserted through said race for defining the limits of travel of each of said balls independently of the other, said stops having opposing faces between which said balls travel.

3. Mounting means for an oscillating member comprising trunnions extending coaxially from opposite sides of said member and bearings for said trunnions, each of said bearings comprising an outer race, a pair of antifriction support balls lying in said race and supporting said trunnion, spacing means fixed in said race including a stop inserted between said balls and fixed in said race for limiting the rolling movement of said balls, the space allowed for said balls and their movement being defined by the angle "M" subtended by two lines drawn through the center of said shaft, each tangential to the leading surface of the leading ball at the two extremes of movement of said balls, being calculated by the equation:

$$M = A + A + 2b \frac{r}{2R + 2r} xa$$

where A equals the angle subtended by two lines tangential to opposite sides of one of said balls and passing through the center of said shaft; R equals the radius of one of said balls, r equals the radius of said shaft, 2b equals the space between the balls and a equals the angle of oscillation of said shaft.

4. An antifriction mounting for an oscillatory member having a given angle of oscillation comprising a pair of pin-like trunnions extending coaxially from opposite sides of said member, and a bearing into which each of said trunnions extends, each of said bearings comprising an outer race, a pair of balls supported in said race and supporting that one of said trunnions extending therein concentrically with said race and spacers fixed in said race including a spacer fixed to said race between the balls to prevent either of said balls from rolling around said trunnion further than that distance said ball is moved by the oscillation of said member and said trunnion.

5. Antifriction mounting means for an oscillatory member having a given angle of oscillation on each side of a center position comprising, a pair of pin-like trunnions extending coaxially in opposite directions from said member, and a bearing for each of said trunnions, each of said bearings comprising an outer race, a pair of balls located in said race and supporting said trunnion concentrically with said race, the adjacent surfaces of said balls being spaced a predetermined distance apart by means fixed in said race for keeping said balls from rolling around said trunnion a distance greater than the distance said balls roll in response to the given oscillation of said member and said trunnion.

6. Mounting means for an oscillatory member having a given angle of oscillation on each side of a center position comprising, a pair of pin-like trunnions extending coaxially in opposite directions from said member, and a bearing for each of said trunnions, each of said bearings comprising an outer race, a pair of balls located in said race and supporting said trunnion concentrically with said race, the adjacent surfaces of said balls being spaced a predetermined distance apart by fixed stops which prevent either of said balls from rolling around said trunnion in either direction a distance greater than the distance said ball rolls in response to the given oscillation of said member and said trunnion.

7. Mounting means for an oscillatory member having a given angle of oscillation on each side of a center position comprising, a pair of pin-like trunnions extending coaxially in opposite directions from said member, and a bearing for each of said trunnions, each of said bearings comprising an outer race, a pair of balls located in said race and supporting said trunnion concentrically with said race, the adjacent surfaces of said balls being spaced a predetermined distance apart by a fixed stop in said race on each side of each of each balls, said stops being so located as to be contacted by the leading surfaces of said balls when said balls have reached the limits of their rolling travel around said trunnion in response to oscillations of said member and said trunnion to the limits of such given angle of oscillation, that one of said stops located between said balls being contacted alternately by said balls when said member is at opposite extremes of such given angle of oscillation.

8. Mounting means for an oscillatory member having a given angle of oscillation on each side of a center position comprising, a pair of pin-like trunnions extending coaxially in opposite directions from said member, and a bearing for each of said trunnions, each of said bearings comprising an outer race, a pair of balls located in said race and supporting said trunnion concentrically with said race, the adjacent surfaces of said balls being spaced a predetermined distance apart by a stop fixed in said race on each side of each of said balls, said stops being so located as to be contacted by the leading surfaces of said balls when said balls have reached the limits of their rolling travel around said trunnion in response to oscillations of said member and said trunnion to the limits of such given angle of oscillation, that one of said stops located between said balls being contacted alternately by said balls when said member is at opposite extremes of such given angle of oscillation, the angular distance f between the center of one of said balls when in contact with one of said stops and the center of said ball when in contact with another of said stops being $$f = \frac{r}{2R + 2r} xa$$

when r equals the radius of said trunnion, R equals the radius of either of said balls and a equals the angle between the limits of oscillation of said member and said trunnion.

9. An antifriction bearing for supporting trunnions of an oscillatory member which has a predetermined angle of oscillation, comprising an outer race concentric with respect to the axis of said trunnions, two supporting balls located therein, and means fixed in said race for defining the movement of each of said balls, said means being so spaced with respect to said balls and said race that said balls contact said means when said oscillatory member is at the limits of its travel and that said balls are independent of said means when said oscillatory member is intermediate its limits of travel.

LAWRENCE S. WILLIAMS.